US012713078B2

(12) United States Patent
Schuler et al.

(10) Patent No.: US 12,713,078 B2
(45) Date of Patent: Aug. 18, 2026

(54) INCREASING SECURITY OF STREAMING MEDIA BY CONVERTING A SECURE MEDIA FORMAT INTO A STREAMING MEDIA FORMAT WITHOUT INTRODUCING LAG

(71) Applicant: STATS LLC, Chicago, IL (US)

(72) Inventors: Andreas Schuler, Palatine, IL (US); Stefan Birrer, Chicago, IL (US); Fabián E. Bustamante, Evanston, IL (US)

(73) Assignee: STATS LLC, Chicago, IL (US)

( * ) Notice: Subject to any disclaimer, the term of this patent is extended or adjusted under 35 U.S.C. 154(b) by 7 days.

(21) Appl. No.: 18/974,637

(22) Filed: Dec. 9, 2024

(65) Prior Publication Data

US 2025/0287051 A1 Sep. 11, 2025

Related U.S. Application Data

(60) Provisional application No. 63/563,244, filed on Mar. 8, 2024.

(51) Int. Cl.

*H04N 21/2343* (2011.01)
*H04N 21/2347* (2011.01)
*H04N 21/845* (2011.01)
*H04N 21/854* (2011.01)

(52) U.S. Cl.

CPC . *H04N 21/234309* (2013.01); *H04N 21/2347* (2013.01); *H04N 21/845* (2013.01); *H04N 21/85406* (2013.01)

(58) Field of Classification Search

None

See application file for complete search history.

(56) References Cited

U.S. PATENT DOCUMENTS 9,936,229 B1 4/2018 Wagenaar et al.
2008/0275905 A1 11/2008 Hannuksela
2013/0219074 A1 8/2013 Dahl et al.
2013/0322628 A1 12/2013 Rhyu et al.
2014/0009578 A1 1/2014 Chen et al.
2014/0079116 A1 * 3/2014 Wang .................. H04N 21/816 375/240.02
2016/0070887 A1 3/2016 Wu et al.
2017/0164046 A1 6/2017 Shamoon et al.
2018/0278964 A1 9/2018 Wang et al.

OTHER PUBLICATIONS

International Search Report and Written Opinion mailed on Jun. 3, 2025, issued in PCT/US2025/018693, total 9 pages.

* cited by examiner

*Primary Examiner* — Lindsay J Uhl

(74) *Attorney, Agent, or Firm* — Bookoff McAndrews, PLLC

(57) ABSTRACT

The following detailed description presents a method for supporting Digital Rights Management (DRM) in real-time streaming. The proposed method attains real-time constraints by reusing the original encoded real-time stream as the carrier of the encrypted data. A system is also specified for implementing the described method on a real-time streaming architecture.

20 Claims, 16 Drawing Sheets

The WebRTC system architecture

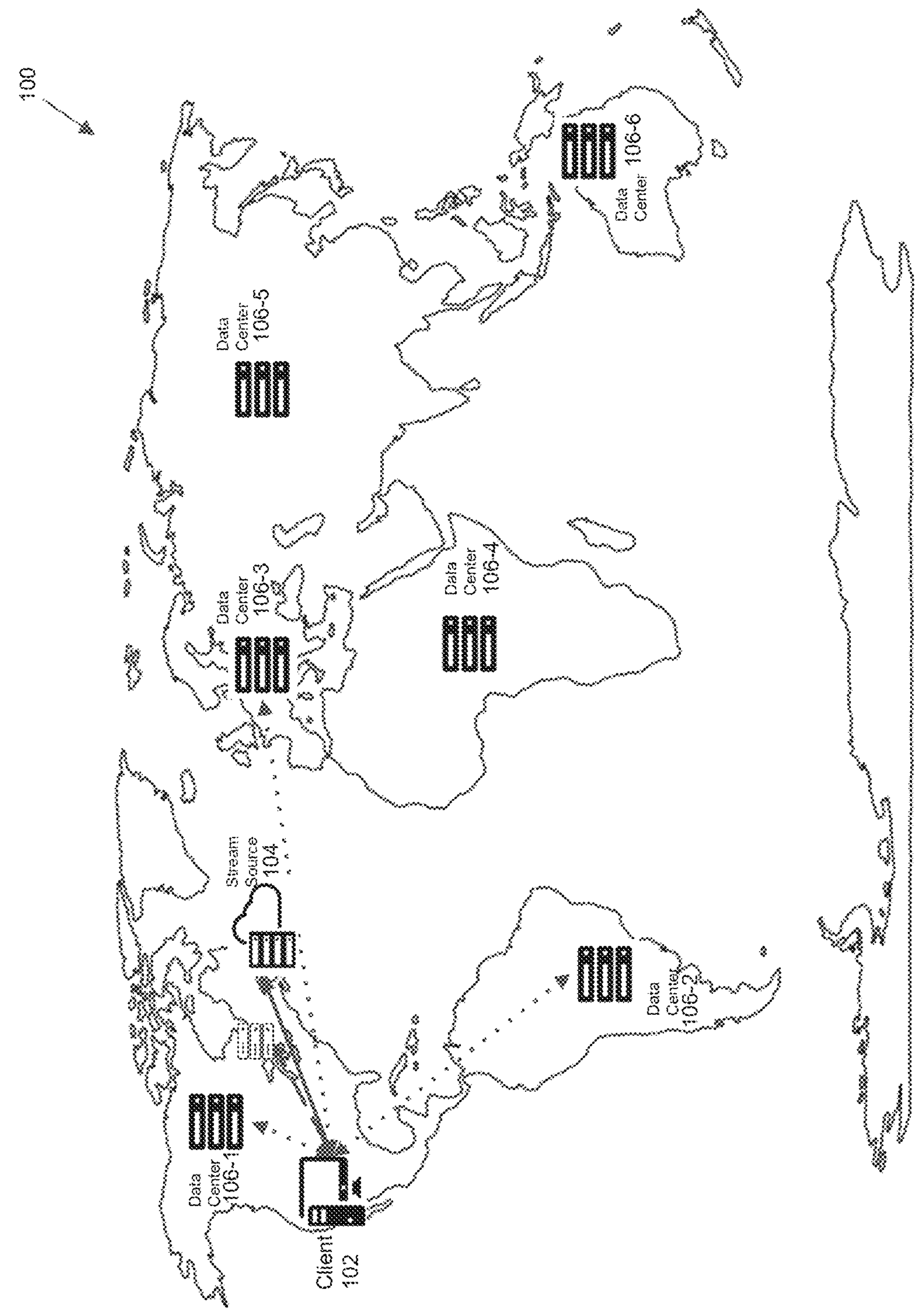
Figure 1: Architectural model of a media streaming system

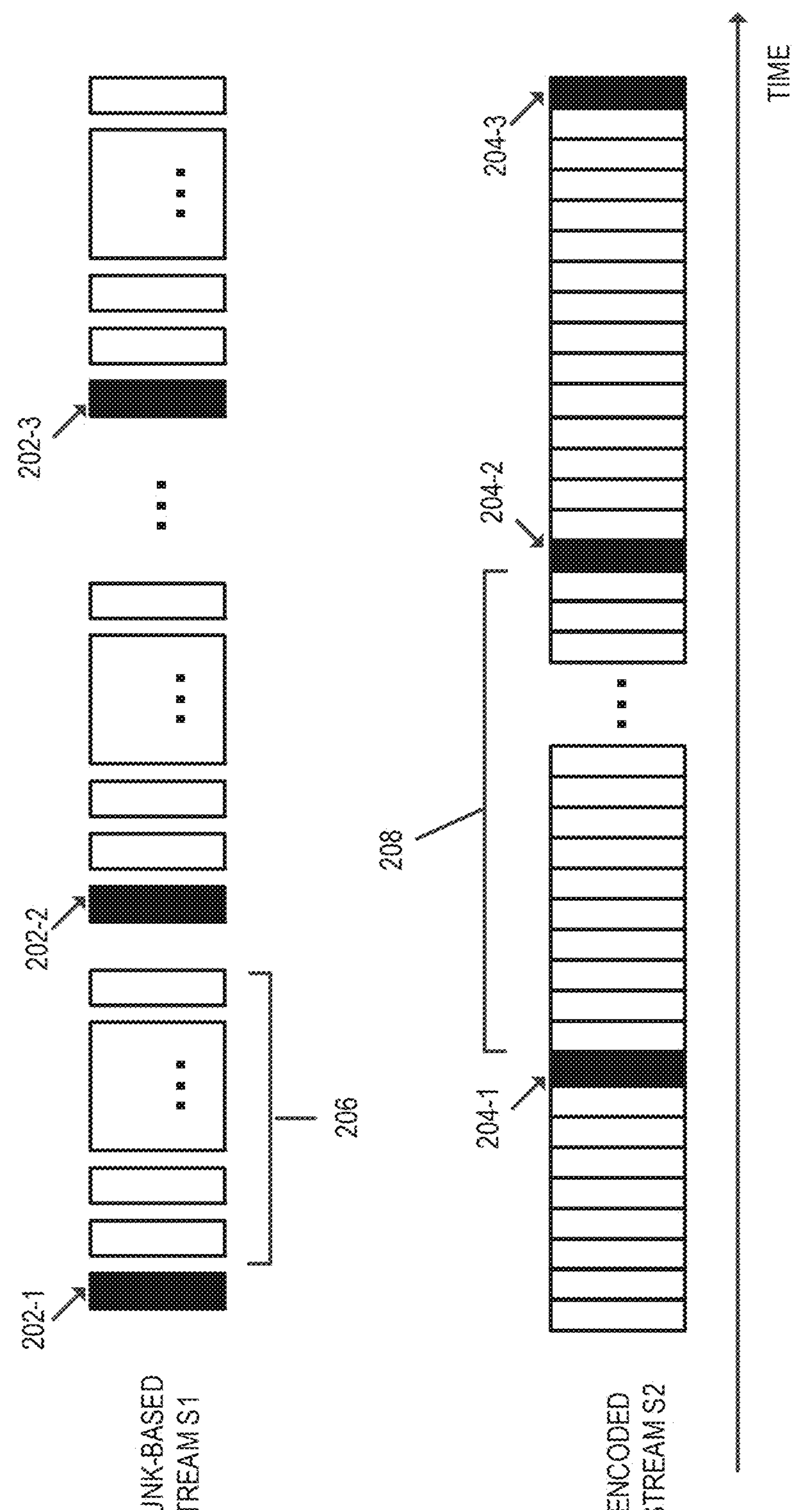
Figure 2: Key and prediction frames on chunks (top) and streams (bottom).

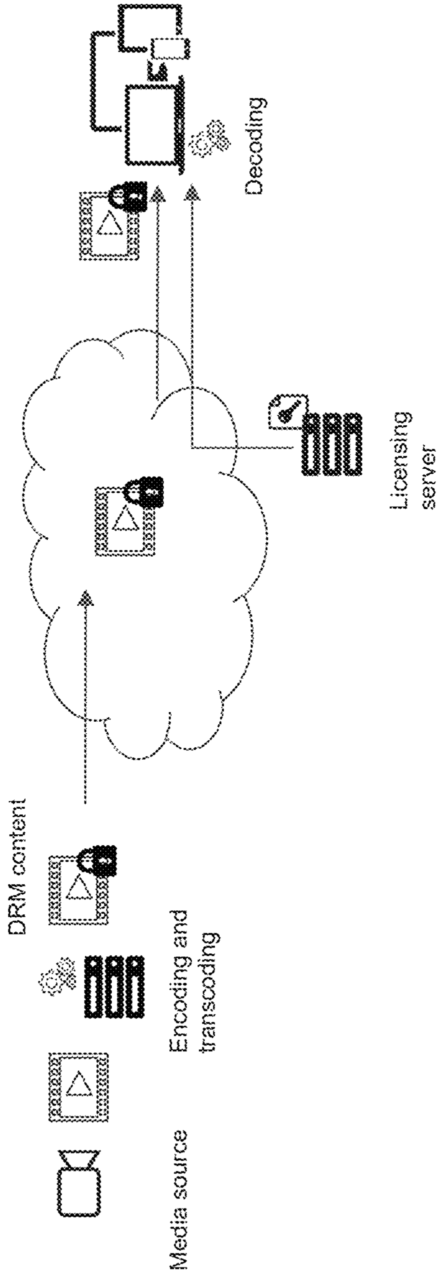
Figure 3: DRM packaging and license issuance

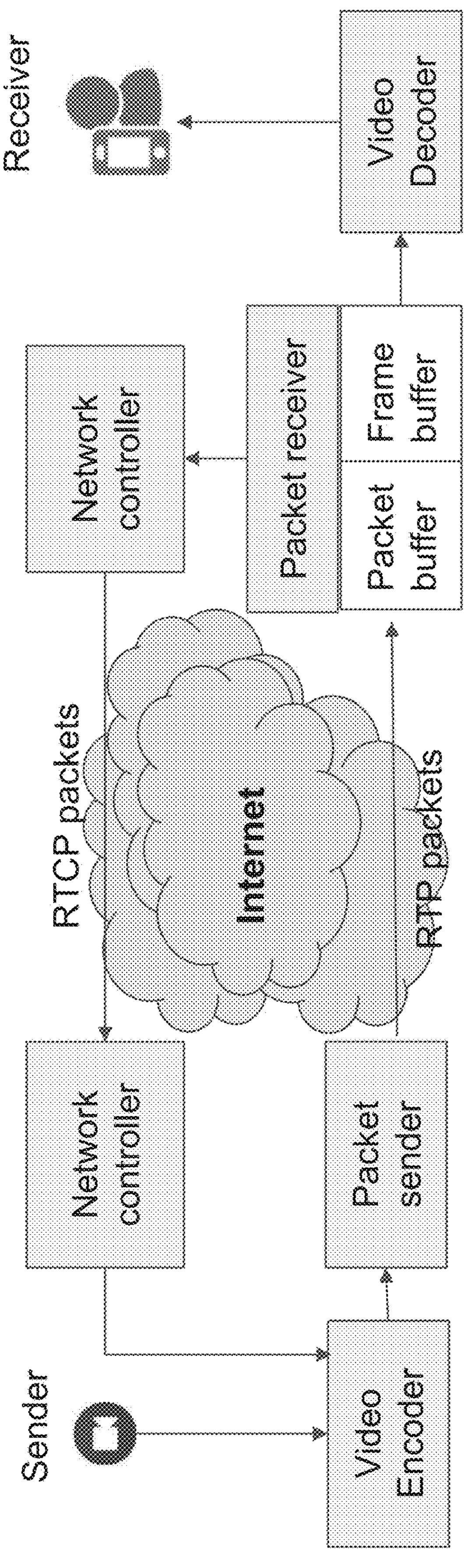
Figure 4: The WebRTC system architecture

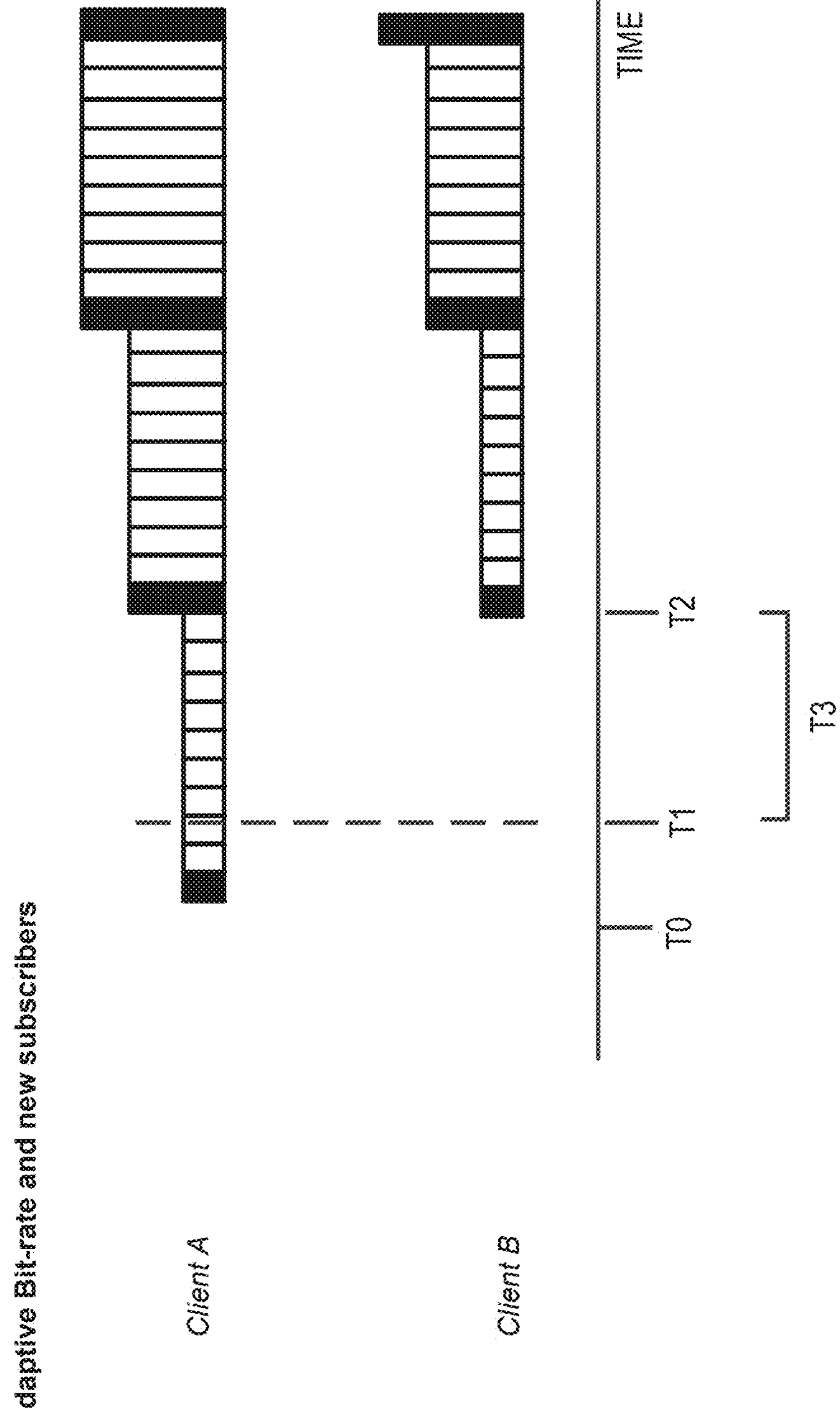
Figure 5A: Stream adaptation.

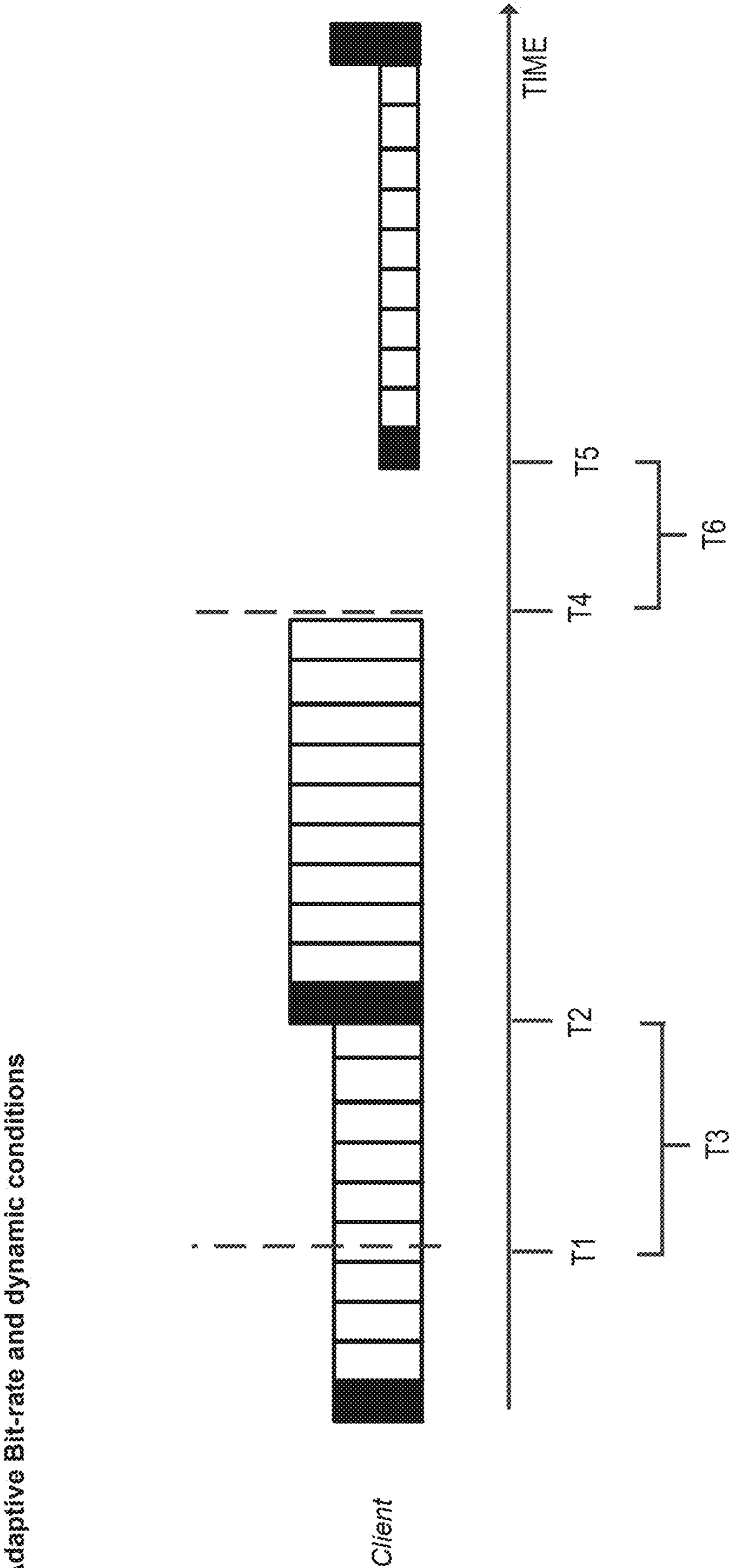
Figure 5B: Stream in dynamic conditions.

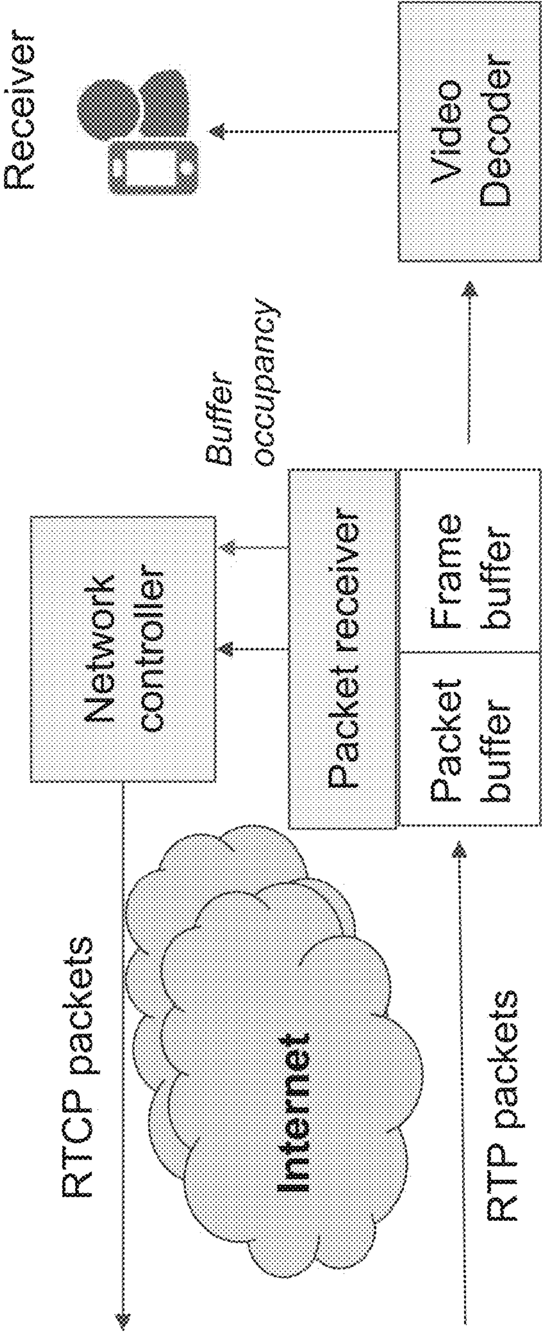
Figure 6: Bitrate selection

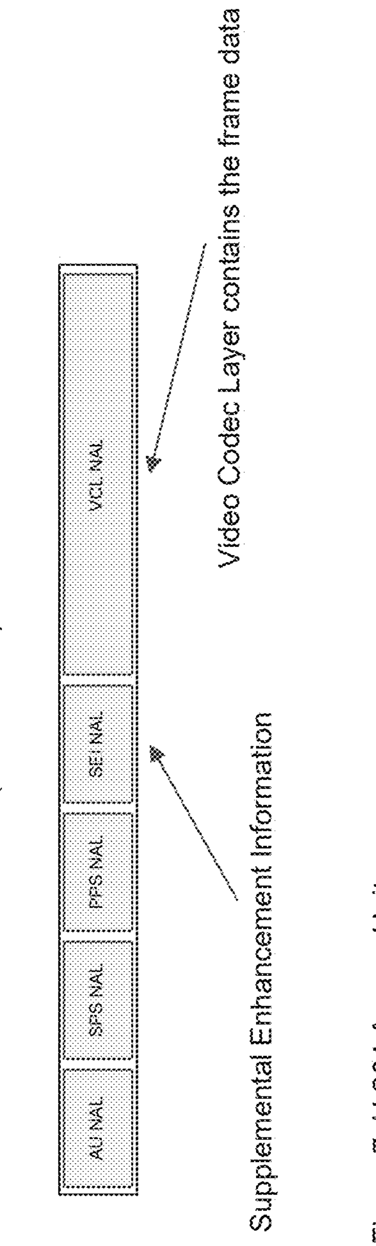
Figure 7: H.264 Access Unit

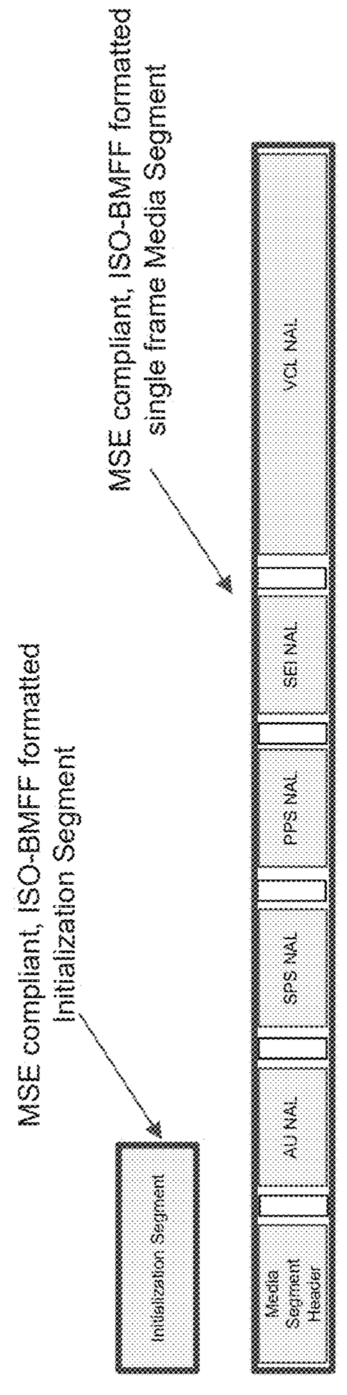
Figure 8: H.264 Access Unit as a ISO-BMFF single-frame media segment

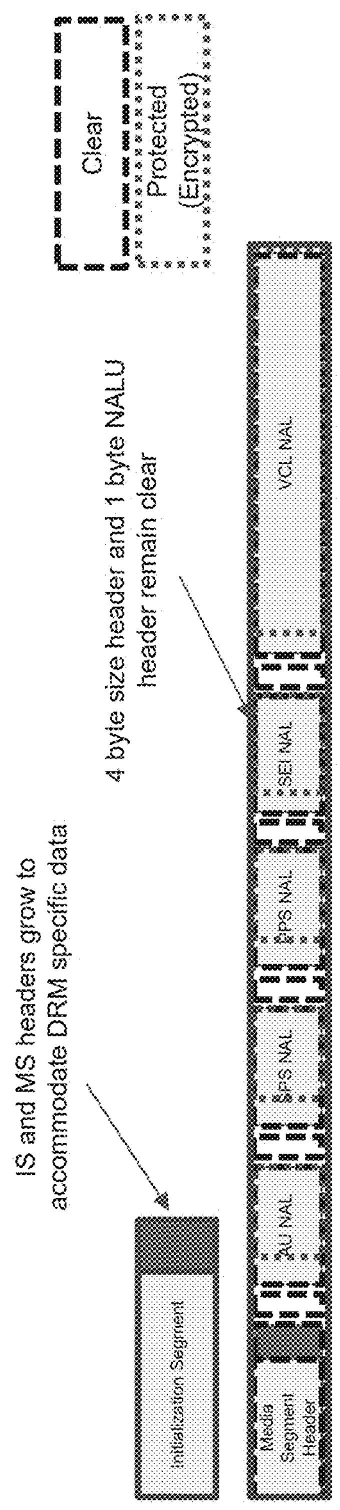
Figure 9: H.264 Access Unit as an encrypted ISO-BMFF single-frame initialization and media segment

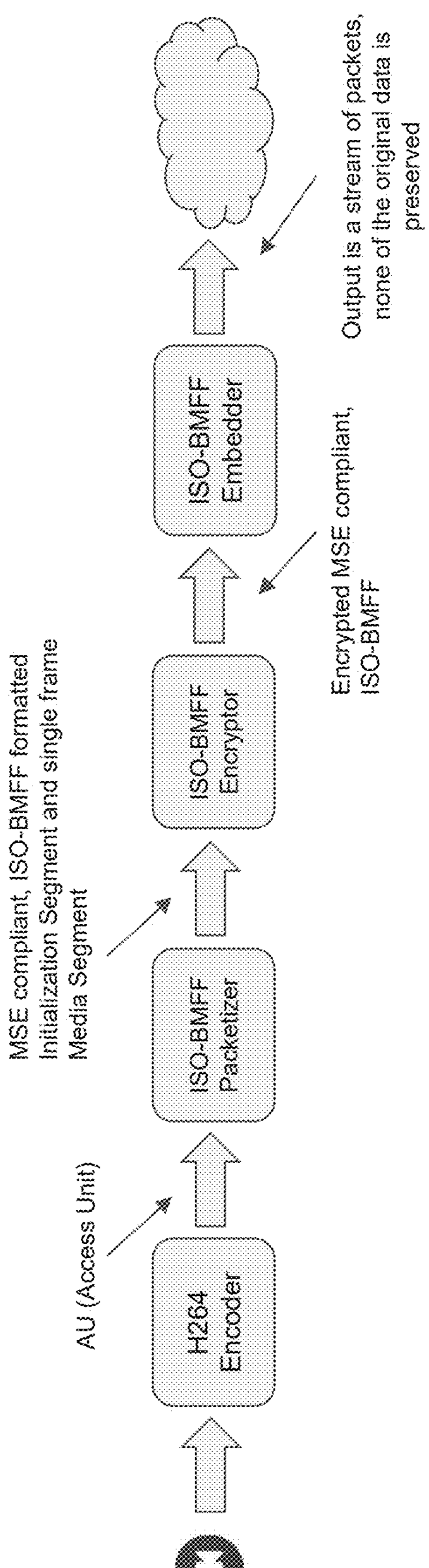
Figure 10: Process from an H.264 AU to an encrypted ISO-BMFF single-frame media segment

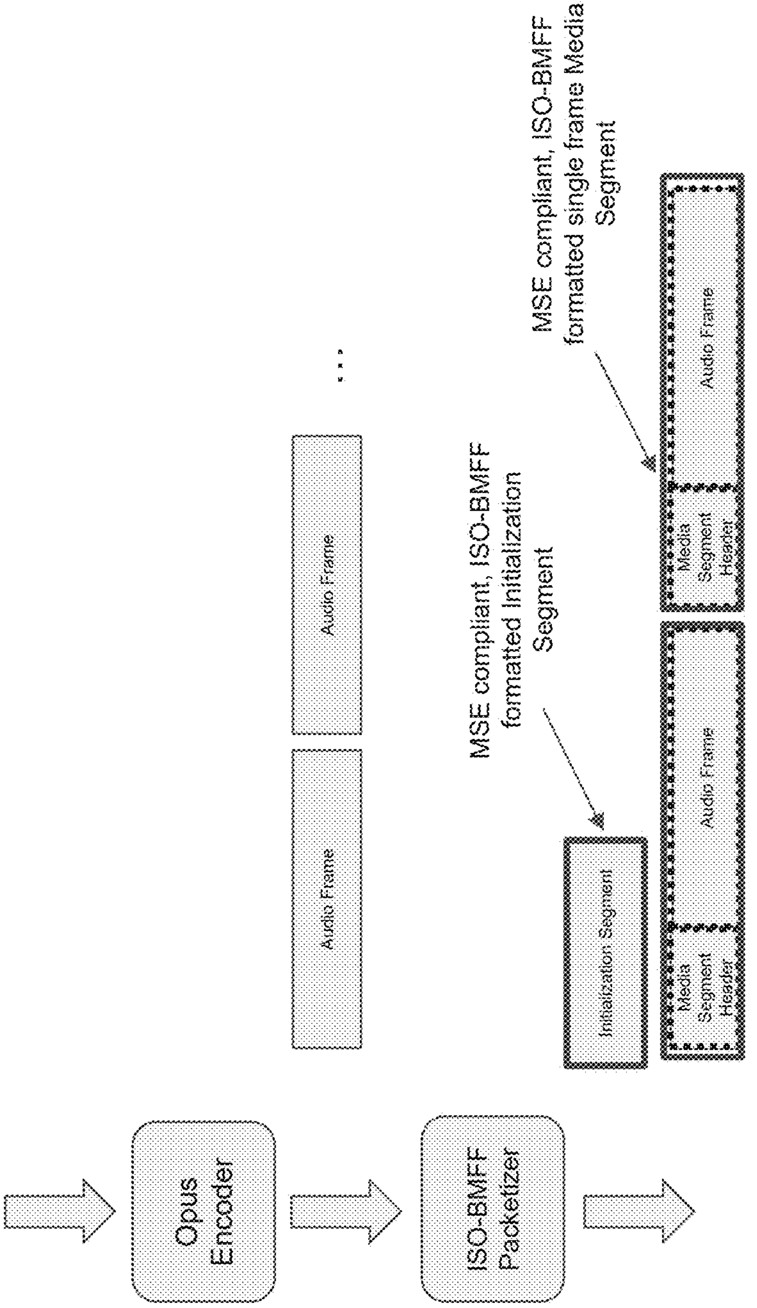
Figure 11: Opus audio frames as ISO-BMFF single frame media segments

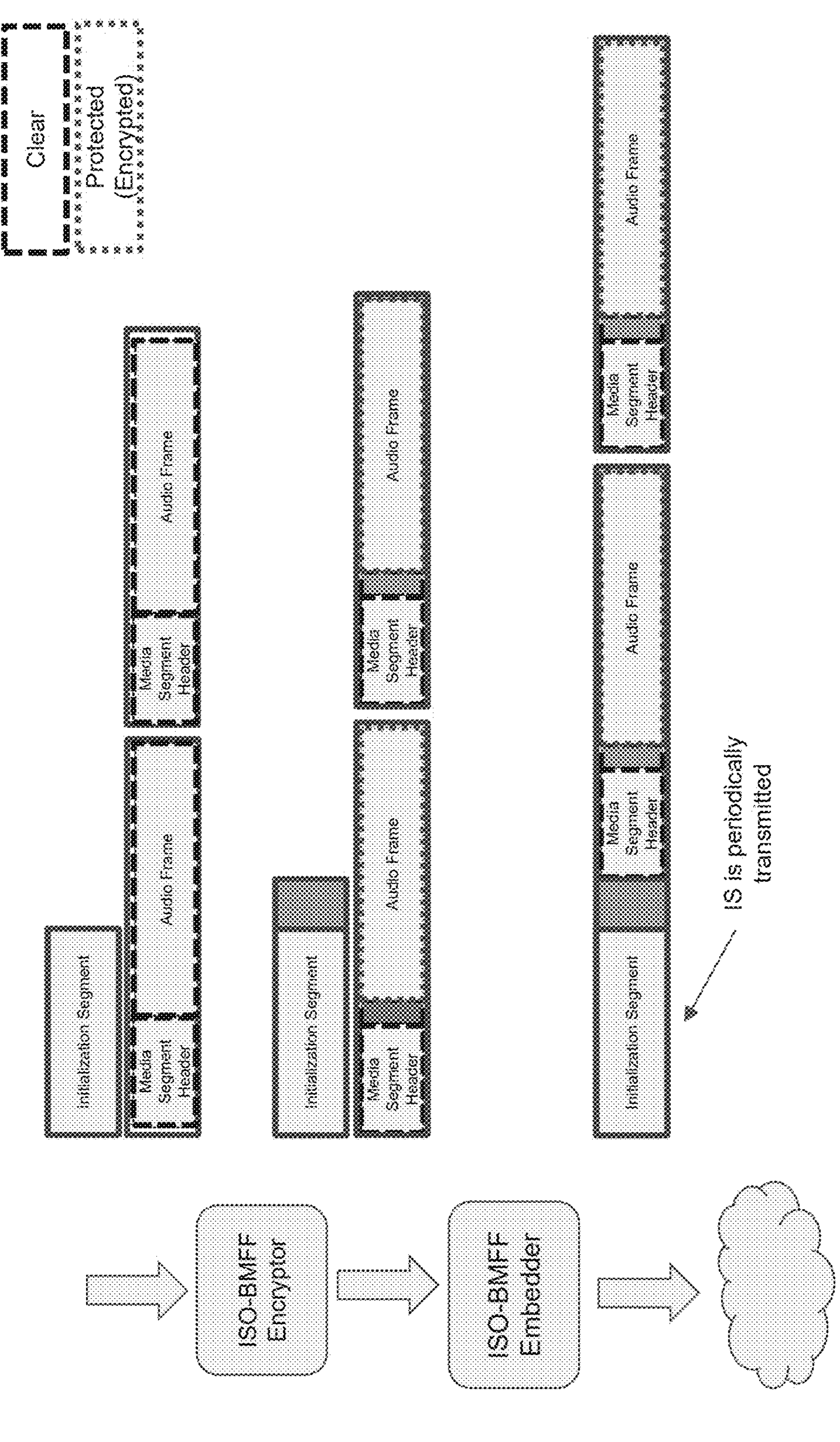
Figure 12: Opus audio frames as a stream of encrypted ISO-BMFF single frame media segments BMFF formatted content (MP4)
Encrypted Media Extensions: Provide API to interact with Content Protection systems
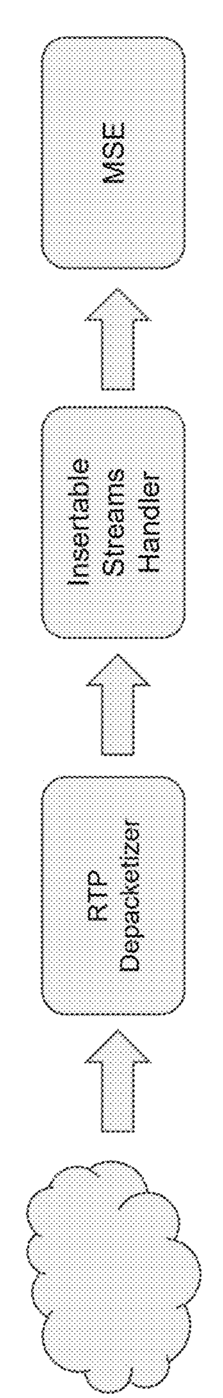
Unpack ISO-BMFF IS and MS. This is trivial for audio; for video, it requires parsing of VCL NAL and stripping of NAL and slice headers. The output is fed to MSE.
Figure 13: From RTP to initialization and media segments for MSE

INCREASING SECURITY OF STREAMING MEDIA BY CONVERTING A SECURE MEDIA FORMAT INTO A STREAMING MEDIA FORMAT WITHOUT INTRODUCING LAG

CROSS-REFERENCE TO RELATED APPLICATIONS

This application claims priority to and benefit of the U.S. Provisional Patent Application Ser. No. 63/563,244 filed Mar. 8, 2024, which is incorporated herein by reference in its entirety.

FIELD OF INVENTION

The present invention relates generally to Digital Rights Management (DRM) in real-time streaming.

BACKGROUND

Media streaming is by far the dominant application traffic on the Internet. In a typical streaming service, video and/or audio data is streamed as a sequence of packets from a collection of servers, where the stream is stored or captured to a number of user devices for playback. Media streaming providers typically offer different types of services, including real time, live, and archived or video on demand (VOD). VoD streaming refers to the streaming of media from one or more servers, where the archived version of a stream is stored, to one or more users at any time without the timing constraints of live or real-time streaming.

BRIEF DESCRIPTION OF THE DRAWINGS

Detailed descriptions of implementations of the present invention will be described and explained through the use of the accompanying drawings.

FIG. 1 illustrates a common architectural model with multiple data centers at points of presence worldwide and media streaming serving infrastructure to which publishers and subscribers can connect.

FIG. 2 illustrates chunk-based and stream content with keyframes and prediction frames.

FIG. 3 illustrates the process of DRM packaging and license issuance.

FIG. 4 illustrates the WebRTC system architecture.

FIG. 5A illustrates an adaptive bit rate streaming for live broadcasting with multiple subscribers.

FIG. 5B illustrates adaptive bit rate streaming for live broadcasting in dynamic network conditions.

FIG. 6 illustrates bit rate selection.

FIG. 7 illustrates an H.264 Access Unit.

FIG. 8 illustrates an H.264 Access Unit as an ISO-BMFF single-frame media segment.

FIG. 9 illustrates an H.264 Access Unit as an encrypted ISO-BMFF single-frame media segment.

FIG. 10 illustrates a process of converting an H.264 AU to an encrypted ISO-BMFF single-frame media segment.

FIG. 11 illustrates Opus audio frames as ISO-BMFF single-frame media segments.

FIG. 12 illustrates Opus audio frames as a stream of encrypted ISO-BMFF single-frame media segments.

FIG. 13 illustrates progression from RTP to initialization and media segments for MSE.

Figure 14:
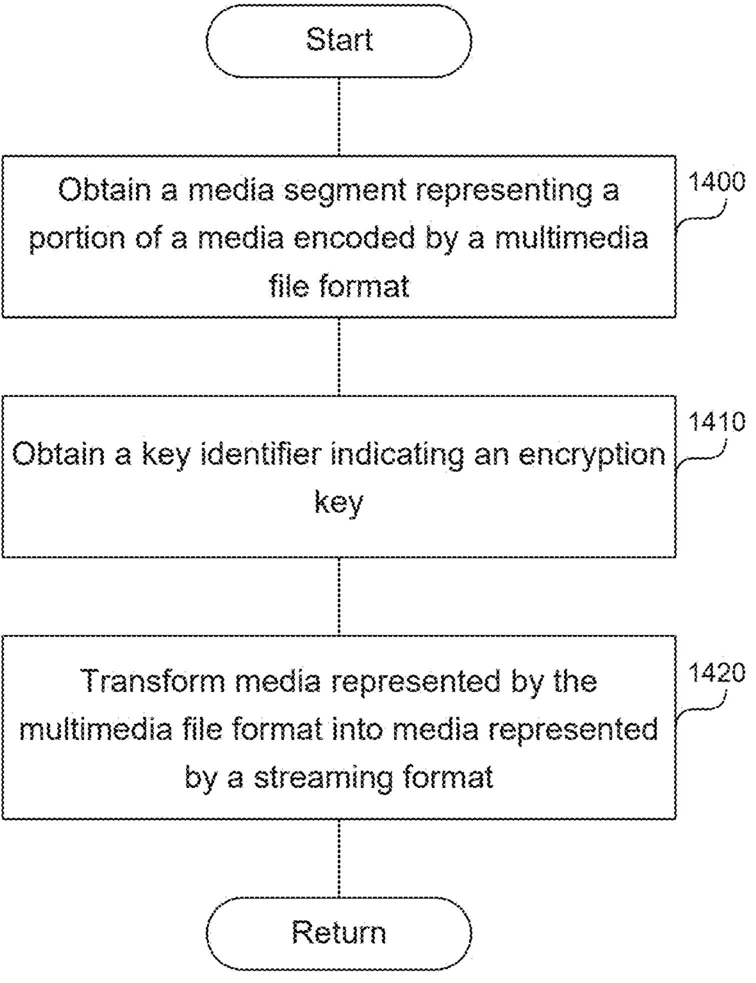
FIG. 14 is a flowchart of a method to increase security of streaming media by converting a secure media format into a streaming media format without introducing lag.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology relates generally to Digital Rights Management (DRM) for media streaming and, more specifically, to DRM methods and apparatuses applicable to real-time media streaming over packet-switched networks such as the Internet. DRM increases security of streaming media because it helps prevent the illegal sharing of content online and protects content creators from digital piracy. DRM can be used to:

Restrict access to certain devices, locations, or IP addresses.

Limit the number of times a user can access or use content

Set an expiration date for content

Prevent users from editing, saving, or printing content

Prevent users from creating screenshots or screen grabs

Watermark documents and artwork to establish ownership

More particularly, the present technology describes an approach to support DRM with real-time media streaming. Key to the approach's ability to maintain real-time constraints for streaming live content is the reuse of the original encoded real-time stream as the carrier of the encrypted data. A system is also specified for implementing the described method on a real-time streaming architecture.

A challenge for real-time media streaming is implementing DRM, given the timing constraints of real time. DRM ensures the secure delivery of various types of content from a Content Provider (CP) to a user, preventing the user from illegally distributing the provided content.

Different DRM solutions are available in the market, including FairPlay Streaming (Apple's solution for HLS streaming), Widevine (Google's solution for DASH and HLS streaming), PlayReady (Microsoft's solution for DASH and HLS streaming), and ClearKey Content Protection (an open DRM solution for DASH streaming). However, adopting a DRM solution for real-time media streaming can introduce complexity and added latency to the streaming processing due to end-user authentication, the encryption/decryption process, the transmission of (larger) encrypted data over the network, and DRM license acquisition, among other factors. An added latency of milliseconds to seconds is problematic for real-time streaming services to operate properly.

The disclosed technology thus provides systems and methods for supporting DRM while satisfying the timing constraints of real-time media streaming. The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Terminology and Concepts

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like may refer to any connection or coupling, either direct or indirect, between two or more elements. The coupling or connection between the elements can be physical, logical, or a combination thereof.

References to "an embodiment" or "one embodiment" mean that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

"Live media streaming" broadly refers to streamed content transmitted over the Internet without first being recorded and stored. This can include broadcasting content that is generated by a source device, transmitted through a network, and rendered by a receiving device. Live video streaming services have a high tolerance to stream lag, which refers to the time from when the event is being streamed, or a specific action within it takes place, to when it is delivered to subscribers. For live video streaming, as provided by solutions such as Apple's HTTP Live Streaming (HLS), stream lags of seconds are not uncommon and generally considered acceptable.

"Real-time media streaming" refers to online streaming of media simultaneously recorded and broadcasted "as it happens" to one or more users, with sufficiently small latencies to enable "natural" interaction between participants, letting participants react to and/or interact with the content and with other participants in the same stream, in "real time." Examples of such a latency that is unperceivable by a user of a device can include 100 ms, 300 ms, or 500 ms. Nevertheless, this definition is not limited to specific latency thresholds but instead more generally in terms of supporting natural user interactivity. Accordingly, users of client devices in a broadcast group can interact with or respond to the live media stream in near real time (i.e., with a delay that is unperceivable to the users of the client devices in the broadcast group).

That is, the small stream lags of these streaming services allow participants to react to and/or interact with the content and with other participants of the same stream. In one example, participants subscribing to a real-time, streamed show can directly communicate with and steer the actions of the performer (e.g., interacting with the performer in a standup comedy show, perhaps responding to questions). In another example, players in a real-time, streamed game of cards could place bets while cards are being turned. In yet another example, a performer could respond to requests from an online audience or players in a real-time, streamed game of cards placing bets while cards are being turned. As such, embodiments of the present technology focus on real-time media streaming.

To provide real-time streaming content to various client devices, a streaming device such as a server can generate a media stream and transmit the media stream over a network to the client devices. Live media streaming requires the use of a codec to compress (e.g., encode) the media and requires using a transport protocol to transport the encoded media over the network. Examples of video compression standards include AVC H.264, H.265, VP8, and VP9. Examples of transport protocols include real-time streaming protocol (RTSP)/real-time protocol (RTP), real-time messaging protocol (RTMP), and Apple HLS. Before a content element (e.g., ad element, ad segment) can be inserted into a given media stream, it may need to be transcoded (converted) to a format that is appropriate for the stream (e.g., H.264) and for the client device that will render the media stream. A content element can include an image, audio, video, text, or combinations thereof.

A media stream can include at least one key frame (e.g., data encoded for rendering a complete frame by a client device) and a sequence of predictive or delta frames that represent differences relative to the key frame. The media stream can include a bit rate that represents a number of bits for the frame of video, where an increased bit rate represents a greater definition of the associated media (e.g., high-definition video). For a new client device to subscribe to streaming media, the client device processes a key frame to render a frame of media. Once the key frame is rendered, the client device can process the subsequent prediction frames to render and output a series of frames of the media.

In one example, a series of key frames and prediction frames may be disposed along a media stream at various times. Examples include intra-frames and inter-frames in VP8, respectively, and key frames and P-frames in Moving Picture Experts Group (MPEG) protocols, respectively. Key frames can be decoded without reference to any other frame in a sequence; that is, the decoder reconstructs such frames beginning from a default state. Key frames provide random access (or seeking) points in a media stream. Prediction frames are encoded with a reference to prior frames, specifically all prior frames up to and including the most recent key frame. Generally, correct decoding of a predictive frame depends on correct decoding of a most recent key frame and all ensuing predictive frames. Consequently, a decoding algorithm is not tolerant of dropped key frames. For example, in an environment in which frames may be dropped or corrupted, correct decoding is not possible until a key frame is correctly received. Moreover, a content element, such as an ad, is typically inserted in a real-time media stream at or relative to a key frame.

RTP is a protocol designed for transmitting audio and video data over the Internet. RTP is used to transport media streams, such as voice and video, in real time. RTP is responsible for packetizing media data into small packets and transmitting it over the network. Each RTP packet contains a sequence number and timestamp, which are used to ensure that the packets are delivered in the correct order and at the correct time. RTP packets are transmitted over user datagram protocol (UDP), which provides low latency and is ideal for real-time communication. RTCP is a protocol designed to provide feedback on the quality of service (QOS) of RTP traffic. As such, RTCP is used to monitor network conditions, such as packet loss and delay, and to provide feedback to the sender. RTCP packets are sent periodically to provide feedback on the quality of the RTP stream.

WebRTC is the standard platform for web-based real-time streaming applications. WebRTC relies on RTP to transmit the encoded video frames. The receiver receives the RTP packets and relies on buffers to generate video frames. In addition, the receiver sends loss and delay reports to the sender using RTCP, which the network controller analyzes to potentially adjust the encoding rate for the sender accordingly.

ISO-BMFF (International Standards Organization Base Media File Format) or MPEG4 is a container file format that defines a general structure for files that contain time-based multimedia data. It is designed as a flexible, extensible format that facilitates interchange, management, editing, and presentation of the media.

MSE (Media Source Extensions) is a W3C specification that allows JavaScripts to send byte streams to media codecs within web browsers to play back media data. Browsers and devices that support MSE can play back chunks of video (or byte-range requests for video segments within a single file), which enables both live and VoD playback of adaptive bit rate streams, complete with closed captions.

EME (Encrypted Media Extensions) is a W3C specification for providing a communication channel between web browsers and the Content Decryption Module (CDM) software, which implements DRM. EME is a JavaScript API that enables HTML5-based DRM by extending MSE with application programming interfaces (APIs) to control the playback of protected content. EME works by incorporating a CDM into the browser, device, or mobile operating system, allowing the browser or device to communicate directly with the license server.

CENC (Common Encryption Scheme) specifies standard encryption and key mapping methods that can be utilized by one or more digital rights and key management systems to enable decryption of the same file using different DRM systems. CENC details the standard encryption and key mapping techniques used to store the DRM-related data for one or more DRM technologies with compressed audio/video data. Managing multiple DRMs is critical because most browsers or other devices will only support one type of DRM, making multi-DRM support necessary for most video producers.

Supporting DRM on a Real-Time Streaming Service

Although the disclosed embodiments describe a fully functioning method and system for supporting DRM on a real-time service using specific protocols, it should be understood that other equivalent embodiments exist. Since numerous modifications and variations will occur to those reviewing this disclosure, the method and system are not limited to the exact construction and operation illustrated and disclosed. Accordingly, this disclosure intends all suitable modifications and equivalents to fall within the scope of the claims.

FIG. 1 illustrates an architectural model 100 with multiple data centers at points of presence worldwide and media streaming serving infrastructure to which publishers and subscribers can connect. As shown, a client device 102 is in communication with a media stream source 104 to request and receive real-time media streams. The stream source 104 is a media streaming serving infrastructure to which publishers and subscribers can connect. The client device 102 can also communicate with data centers having POP in common with the client device. As shown, there are multiple data centers 106-1 through 106-6 (collectively referred to as "data centers 106") around the world. Once a data center is selected, the client device 102 sets and authenticates a persistent control channel with the streaming service of the stream source 104 before using this control channel to subscribe to the real-time media stream. The client device 102 that is trying to subscribe to a real-time media stream typically first selects a nearby PoP. This selection takes the set of available regions as input and could be based, for instance, on the geographic or network location of the client device 102 or the response time of the service to a minimal request.

Encoded Media Stream

FIG. 2 illustrates chunk-based or stream content with keyframes and prediction frames. The encoded media stream (e.g., chunk-based stream S1, encoded stream S2) may include data representing media content, such as a live video stream, for example.

An encoded media stream may include a series of key frames (e.g., key frames 202-1 to 202-3, 204-1 to 204-3) and subsequent prediction frames (e.g., set of prediction frames 206, 208). A key frame (e.g., first key frame 202-1) (or "i-frame") may represent a full frame of the image in a video. As an example, key frames may be similar to intra-frames in VP8 or key frames in MPEG.

In operation, a client device may process a first key frame 202-1, 204-1 to render the corresponding media content, such as a frame of a video. Key frames may be decoded without reference to any other frame in a sequence, where the decoder reconstructs such frames beginning from the decoder's "default" state. In some embodiments, key frames may provide random access (or seeking) points in a video stream.

The encoded media stream may also include a plurality of prediction frames 206, 208 (or "delta frames") succeeding the key frame with respect to time. Prediction frames 206, 208 may represent the differences between the key frame, which may lower the required data to render the frame represented by the predicted frame. As an example, prediction frames 206, 208 may be similar to inter-frames in VP8 or P-frames in MPEG terminology. Prediction frames 206, 208 may be encoded with reference to prior frames, and, in some embodiments, all prior frames may be encoded up to and including the most recent key frame. In many cases, the correct decoding of a predictive frame 206, 208 depends on the correct decoding of the most recent key frame and all ensuing predictive frames. Consequently, the decoding algorithm may not be tolerant of dropped key frames. In an environment in which frames may be dropped or corrupted, correct decoding may not be possible until a key frame is correctly received.

A media stream can be encoded using an encoding technique, such as chunked transfer encoding to create chunks (i.e., divided and non-overlapping portions of the media stream). Chunk-based stream S1 in FIG. 2 may represent an example of a chunk-based stream. Chunks of an encoded media stream may be transmitted and received independently of one another. In some embodiments, both the recipient and the sender of the chunk-based stream may not need to know of the data stream outside of the chunk currently being processed.

FIG. 3 illustrates a process of DRM packaging and license issuance. In general, DRM for media streaming content in a web browser involves a combination of encryption, licensing, and secure playback. The media to be streamed is encrypted on the server side before transmission. When a user attempts to access the DRM-protected content, the browser sends a request to the licensing server with some potentially additional information, such as the capabilities of the user's device. The license server evaluates the requests and, if valid and/or authenticated, issues a license to the user. The license contains the decryption keys, and/or instructions on how to obtain them, that are required to decode the DRM-protected content. Once the browser receives the encrypted content and the corresponding licenses, it uses the description keys to decrypt content, which can then be played back by the browser using the appropriate codec. In ISO-BMFF, for example, the data contains the encoded content and common encryption (CENC) DRM information for several DRMs. This information is delivered to an EME-compatible browser that communicates with the appropriate license server for one of the DRMs and obtains the decryption key. Once decrypted, the data is played back via MSE.

FIG. 4 illustrates the WebRTC system architecture. WebRTC is the standard platform for web-based real-time streaming applications. WebRTC uses the RTP protocol for transporting audio and video. WebRTC has three components: the sender, network controller, and receiver. WebRTC relies on RTP to transmit the encoded video frames. The sender takes the inferred rate from the network controller and encodes video frames captured by the camera at that rate. These encoded video frames are packetized into RTP packets and transmitted. The receiver receives the RTP packets and relies on buffers to generate video frames. RTP packets have a payload type field that describes which media codec can be used to handle a packet. In addition, the receiver sends loss and delay reports to the sender using RTCP, which the network controller analyzes to potentially adjust the encoding rate for the sender accordingly.

WebRTC establishes a baseline set of codecs that all compliant browsers must support, including H.264 and VP8 for video and Opus and G.711 for audio. The encoded stream to be transmitted using RTP, such as H.264 or Opus, cannot be used for DRM encryption/decryption, which expects ISO-BMFF. ISO-BMFF, on the other hand, cannot be transmitted as is over RTP.

FIG. 5A illustrates an adaptive bit rate streaming for live broadcasting with multiple subscribers. As shown, multiple subscribers (e.g., Client A (subscriber 1), Client B (subscriber 2)) can subscribe to an encoded media stream. As an example, Client A may subscribe to the encoded media stream at time TO. Client B may subscribe at time T1. In some embodiments, if the encoded media stream utilizes adaptive bit rate streaming, each distribution layer of the stream may previously be encoded. However, with live broadcasting, a new client (e.g., Client B) subscribing to the already broadcasting encoded media stream requests a new key frame at a specific resolution (i.e., a distribution layer of the stream associated with the specific resolution). In many cases, the new Client B can request the encoded media stream at a subscription time before the arrival of a new key frame at time T2 in relation to the time domain. The time period between the subscription time of the new client T1 and the time where the first frame is rendered T2 may include the startup latency T3.

FIG. 5B illustrates adaptive bit rate streaming for live broadcasting in dynamic network conditions. In some embodiments, in response to changing network conditions, a client may request changing the bit rate of an encoded media stream to adapt to the changing network conditions.

As an example, as shown in FIG. 5B, the client can determine that a higher bandwidth is available at a first time T1. Determining that a higher bandwidth is available may include the client identifying that available bandwidth can accommodate processing a higher bit rate encoded media stream. Accordingly, the client may request to subscribe to a distribution layer with a higher bit rate to increase the quality of the representative media.

However, to subscribe to a distribution layer with a greater bit rate, the client may have to wait until a new key frame for the requested distribution layer arrives at time T2. Accordingly, the duration between the first time T1 and time T2 represents a time duration where bandwidth is underutilized T3. This wait time T3 (or "time to first frame") with underutilized bandwidth may result in a lower quality of client experience, as the bit rate of the decoded media is at a lower quality than the quality resulting from the higher bit rate stream.

Additionally, as shown in FIG. 5B, the client can incur a bandwidth drop at time T4. A bandwidth drop may include the available bandwidth lowering, where a client may be unable to process the encoded media stream at a present bit rate. In this example, the client can request a lower bit rate stream, and a new key frame at the lower bit rate may arrive at a later time (e.g., first key frame time T5). The time duration from the bandwidth drop-time T4 and the time of the new key frame T5 may be a render discontinuity time duration T6. During the render discontinuity time, the resulting media may be interrupted/glitching or unable to display the media, adaptive bit rate, and dynamic conditions.

FIG. 6 illustrates bit rate selection. As shown, RTP protocol is used to transport encoded frames (e.g., audio and video). A sender takes the inferred bit rate from the network controller and encodes video frames captured by a camera at that rate. The encoded video frames are packetized into RTP packets and transmitted. The receiver receives the RTP packets and relies on buffers (e.g., packet buffer, frame buffer) to generate video frames. RTP packets have a payload type field that describes which media codec can be used to handle a packet. In addition, the receiver sends loss and delay reports to the sender using RTCP, which the network controller analyzes to potentially adjust the encoding rate for the sender accordingly.

The present disclosure describes an approach to transparently support DRM in a WebRTC platform while conforming to the real-time constraints by reusing the original encoded real-time stream as the carrier of the encrypted data. The approach packetizes the originally encoded stream in ISO-BMFF for encryption and then embeds the encrypted ISO-BMFF payload in the original encoded stream, pretending this is a valid H.264 or Opus segment.

The disclosed technology presently uses H.264 as an example. H.264 can encode high-quality video at lower bit rates than older compression standards. FIG. 7 illustrates the H.264 Access Unit (AU). The structure of the H.264 AU represents a single video frame. A single AU can consist of multiple packets, called NAL (Network Abstraction Layer) units, including AU NAL, SPS NAL, PPS NAL, SEI NAL, and VCL NAL. The payload, the frame data, is contained in the VCL or Video Coding Layer, of which there can be one or more per AU. Another important NAL in this context is SEI NAL or Supplemental Enhancement Information, which allows one to include arbitrary data that decoders will ignore.

These H.264 AUs are packetized as ISO-BMFF with two types of segments: an initialization and a media segment. For example, FIG. 8 illustrates an H.264 AU as an ISO-BMFF single-frame media segment. The initialization segment is a header that describes, among other things, what is inside the media segment. The SEI NAL contains an initialization segment with a UUID identifying the source. One can include multiple initialization segments.

The resulting ISO-BMFF segments are encrypted. For example, FIG. 9 illustrates an H.264 Access Unit as an encrypted ISO-BMFF single-frame media segment. The initialization and media segments grow to accommodate DRM-specific data, among other things, the key identifier in DRM (a 16-byte value needed to retrieve the key). The encryption can be partial, as illustrated, leaving the headers unencrypted.

The encrypted ISO-BMFF segment is embedded in the original encoded stream as if it were a valid H.264 unit after having stripped that original AU and turned it into a "carrier" AU. For example, FIG. 10 illustrates a process of converting an H.264 AU to an encrypted ISO-BMFF single-frame media segment. The media segment gets attached to the last stripped VCL NAL unit within a given AU. The initialization segment (IS) gets inserted into a new SEI NAL unit. That SEI gets inserted in front of the first VCL within the given AU.

The described embedding can be done on a frame-by-frame basis without adding any lag.

The proposed approach is general, and a series of figures (FIGS. 11-13) included in this disclosure illustrate the disclosed technology using Opus audio frames as another example. Audio frames are included in ISO-BMFF segments.

An initialization segment is inserted periodically, as it is needed to provide the client with a synchronization point, and when inserted, it is merged with the media segment such that one packet will include the initialization segment followed by the media segment (FIG. 11).

Encryption works similarly in this case, with the encrypted part being the audio frame. The encrypted segments are embedded completely into an Opus stream.

The approach can be easily adapted to the need for bigger frames (e.g., higher audio bit rates) than what would fit into an RTP packet, moving the initialization segment to its packet (increasing the packets per second).

On the client side, the received segments are unpacked and passed on to the Media Source Extension of an MS-compliant browser for playback. Unpacking ISO-BMFF initialization and media segments is trivial for the illustration case of audio and requires some parsing for the example of video.

FIG. 14 is a flowchart of a method to increase security of streaming media by converting a secure media format into a streaming media format without introducing lag. A hardware or software processor described in this application can, in step 1400, obtain a media segment representing a portion of a media represented by a multimedia file format. The multimedia file format can be ISO-BMFF, which can be encrypted and is a secure media format. However, ISO-BMFF is not configured for streaming and does not conform to RTP and cannot be streamed as is. ISO-BMFF is a container file format that defines a general structure for files that contain time-based multimedia data such as video and audio.

The media segment can be a single frame in the ISO-BMFF and can include multiple packets including a first packet that is ignored by a decoder and a second packet that includes a payload—that is, the content of the media file format. The first packet can be SEI NAL, while the second packet can be VCL NAL.

In step 1410, the processor can obtain a key identifier indicating an encryption key. The key identifier can indicate how to compute the encryption key and/or where to obtain the encryption key. The memory occupied by the key identifier, for example, 16 bytes, is small compared to the memory occupied by the media represented by the multimedia file format.

In step 1420, the processor can transform media represented by the multimedia file format into media represented by a streaming format by performing the following steps. First, the processor can include the key identifier in the first packet of a segment associated with the media represented by the streaming format, thereby causing the decoder to ignore the key identifier. The segment associated with the media represented by the streaming format can be the AU, which can represent a keyframe configured to be decoded without reference to another access unit in the media represented by the RTP or can represent a delta frame configured to be decoded along with a previous keyframe associated with the media represented by the RTP. Second, the processor can encrypt the payload using the encryption key to obtain an encrypted payload. Third, the processor can include the encrypted payload in a second packet associated with the segment. Fourth, the processor can increase security of streaming the media represented by the multimedia file format without introducing lag by streaming the media represented by the streaming format because the time to decrypt the media represented by the streaming format is small compared to network delay.

The media segment can include additional packets the processor can also encrypt. The processor can obtain the media segment representing the portion of the media represented by the multimedia file format, where the multiple packets include an Access Unit Network Abstraction Layer (AU NAL) packet, a Sequence Parameter Set Network Abstraction Layer (SPS NAL), a Picture Parameter Set Network Abstraction Layer (PPS NAL), the first packet, the second packet, and an initialization segment. Each packet among the multiple packets can include a header and a body. The processor can transform the media segment associated with the multimedia file format into the segment associated with the streaming format by performing the following steps. First, the processor can add the initialization segment associated with multimedia file format to the first packet of the segment. Second, the processor can encrypt the body of each packet among the multiple packets to obtain multiple encrypted bodies. Finally, the processor can add multiple headers associated with each packet among the multiple packets and the multiple encrypted bodies to the segment associated with the streaming format.

The processor can perform bit rate selection. Specifically, the processor can create multiple streams of the media represented by streaming format, where a first streaming among the multiple streams has a higher bit rate than a second stream among the multiple streams. The processor can send the first stream to a client. The processor can obtain a request from the client to lower the bit rate. Upon receiving the request, the processor can send the second stream to the client.

The processor can send the segment associated with the media represented by the streaming format to a receiver over a network, where the network causes the network delay. The processor can cause the receiver to decrypt the encrypted payload, where decrypting the encrypted payload requires a first amount of time. The processor can cause the receiver to decode the segment associated with the media represented by the streaming format, where decoding the segment associated with the media represented by the streaming format requires a second amount of time. The processor can increase security of streaming the media represented by the multimedia file format without introducing the lag because the first amount of time is less than a combination of the network delay and the second amount of time. Specifically, the first amount of time to decrypt the encrypted payload can take several milliseconds (ms), such as less than 10 ms. Similarly, the second amount of time to decode the segment can take several milliseconds. However, the network delay can be large in comparison, approximately 50 ms or more. Thus, the added delay of decryption is imperceptible compared to the network delay.

Computer System

Figure 15:
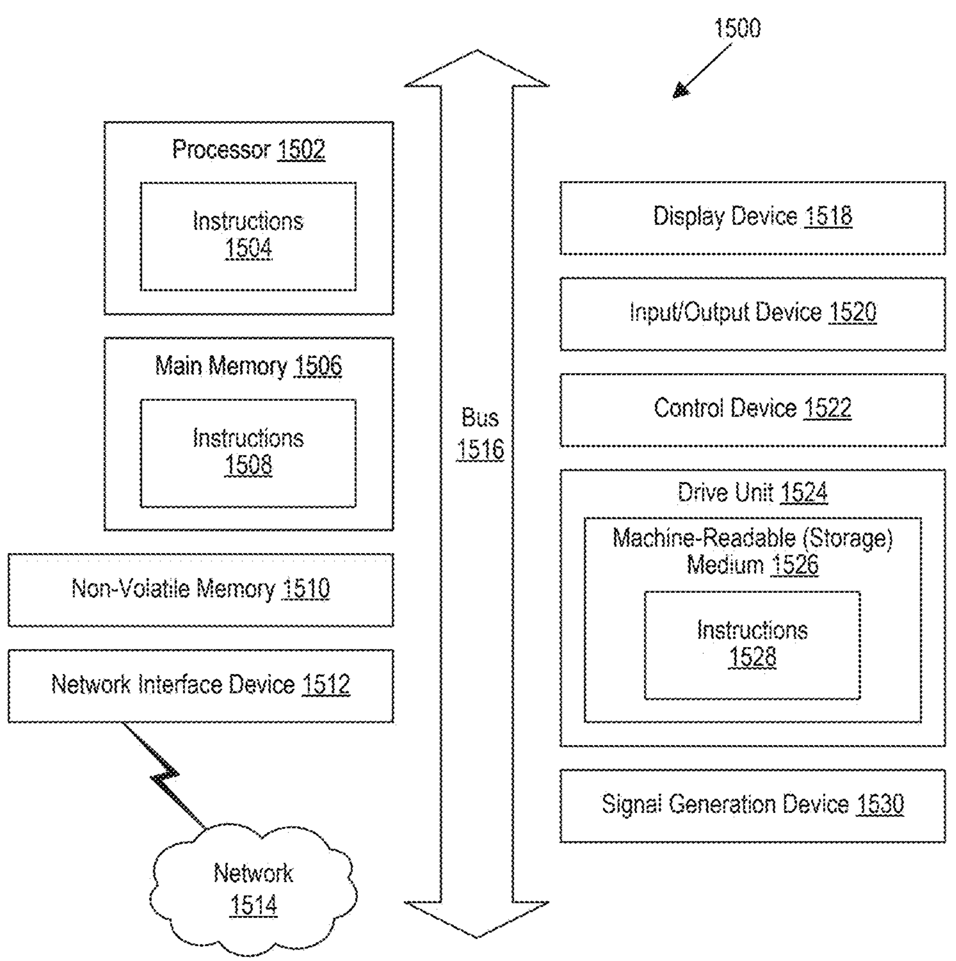
FIG. 15 is a block diagram that illustrates an example of a computer system in which at least some operations described herein can be implemented.

FIG. 15 is a block diagram that illustrates an example of a computer system 1500 in which at least some operations described herein can be implemented. As shown, the computer system 1500 can include one or more processors 1502, main memory 1506, non-volatile memory 1510, a network interface device 1512, a video display device 1518, an input/output device 1520, a control device 1522 (e.g., keyboard and pointing device), a drive unit 1524 that includes a machine-readable (storage) medium 1526, and a signal generation device 1530 that are communicatively connected to a bus 1516. The bus 1516 represents one or more physical buses and/or point-to-point connections that are connected by appropriate bridges, adapters, or controllers. Various common components (e.g., cache memory) are omitted from FIG. 15 for brevity. Instead, the computer system 1500 is intended to illustrate a hardware device on which components illustrated or described relative to the examples of the Figures and any other components described in this specification can be implemented.

The computer system 1500 can take any suitable physical form. For example, the computing system 1500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1500. In some implementations, the computer system 1500 can be an embedded computer system, a system-on-chip (SOC), a single-board computer system (SBC), or a distributed system such as a mesh of computer systems, or it can include one or more cloud components in one or more networks. Where appropriate, one or more computer systems 1500 can perform operations in real time, in near real time, or in batch mode.

The network interface device 1512 enables the computing system 1500 to mediate data in a network 1514 with an entity that is external to the computing system 1500 through any communication protocol supported by the computing system 1500 and the external entity. Examples of the network interface device 1512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1506, non-volatile memory 1510, machine-readable medium 1526) can be local, remote, or distributed. Although shown as a single medium, the machine-readable medium 1526 can include multiple media (e.g., a centralized/distributed database and/or associated caches and servers) that store one or more sets of instructions 1528. The machine-readable medium 1526 can include any medium that is capable of storing, encoding, or carrying a set of instructions for execution by the computing system 1500. The machine-readable medium 1526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in computing device(s). When read and executed by the processor 1502, the instruction(s) cause the computing system 1500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to:

obtain a media segment representing a portion of a media encoded by an ISO base media file format (ISO-BMFF), wherein the ISO-BMFF is not configured for Web Real-Time Communication (WebRTC) streaming, wherein the media segment includes multiple packets including a Supplemental Enhancement Information Network Abstraction Layer (SEI NAL) packet, and a Video Coding Layer Network Abstraction Layer (VCL NAL) packet, wherein data added to the SEI NAL packet is ignored by a decoder, wherein the VCL NAL packet includes a payload;

obtain a key identifier indicating an encryption key, wherein memory occupied by the key identifier is small compared to the memory occupied by the media represented by the ISO-BMFF;

transform the media represented by the ISO-BMFF into media represented by a real-time protocol (RTP) by:

including the key identifier in a SEI NAL packet of an access unit associated with the media represented by the RTP, thereby causing the decoder to ignore the key identifier;

encrypting the payload using the encryption key to obtain an encrypted payload;

including the encrypted payload in the VCL NAL associated with the access unit;

adding an initialization segment describing contents of the media segment to the access unit;

increasing security of streaming the media represented by the ISO-BMFF without introducing lag by streaming the media represented by the RTP, wherein time to decrypt the media represented by the RTP is small compared to network delay.

2. The non-transitory, computer-readable storage medium of claim 1, comprising instructions to:

obtain the media segment representing the portion of the media represented by the ISO-BMFF, wherein the multiple packets include an Access Unit Network Abstraction Layer (AU NAL) packet, a Sequence Parameter Set Network Abstraction Layer (SPS NAL), a Picture Parameter Set Network Abstraction Layer (PPS NAL), the SEI NAL, the VCL NAL, and the initialization segment, wherein each packet among the multiple packets includes a header and a body; and transform the media segment associated with the ISO-BMFF into the access unit associated with the RTP by:

adding the initialization segment associated with the ISO-BMFF to the SEI NAL of the access unit;

encrypting the body of each packet among the multiple packets to obtain multiple encrypted bodies; and adding multiple headers associated with each packet among the multiple packets and the multiple encrypted bodies to the access unit associated with the RTP.

3. The non-transitory, computer-readable storage medium of claim 1, comprising instructions to:

send the access unit to a receiver over a network, wherein the network causes the network delay;

cause the receiver to decrypt the encrypted payload, wherein decrypting the encrypted payload requires a first amount of time;

cause the receiver to decode the access unit, wherein decoding the access unit requires a second amount of time; and increase the security of streaming the media represented by the ISO-BMFF without introducing the lag, wherein the first amount of time is less than a combination of the network delay and the second amount of time.

4. The non-transitory, computer-readable storage medium of claim 1, comprising instructions to:

create multiple streams of the media represented by the RTP, wherein a first stream among the multiple streams has a bit rate higher than a second stream among the multiple streams;

send the first stream to a client;

obtain a request from the client to lower the bit rate; and upon receiving the request, send the second stream to the client.

5. The non-transitory, computer-readable storage medium of claim 1, wherein the media represented by the ISO-BMFF includes video and/or audio.

6. The non-transitory, computer-readable storage medium of claim 1, comprising instructions to:

obtain the media segment representing the portion of the media represented by the ISO-BMFF, wherein the multiple packets include an Access Unit Network Abstraction Layer (AU NAL) packet, a Sequence Parameter Set Network Abstraction Layer (SPS NAL), a Picture Parameter Set Network Abstraction Layer (PPS NAL), the SEI NAL, the VCL NAL, and the initialization segment; and transform the media segment associated with the ISO-BMFF into the access unit represented by the RTP by:

adding the initialization segment associated with the ISO-BMFF to the SEI NAL associated with the RTP.

7. A method comprising:

obtaining a media segment representing a portion of a media represented by a multimedia file format, wherein the multimedia file format is not configured for streaming, wherein the media segment includes multiple packets including a first packet that is ignored by a decoder, and a second packet that includes a payload;

obtaining a key identifier indicating an encryption key, wherein memory occupied by the key identifier is small compared to the memory occupied by the media represented by the multimedia file format;

transforming the media represented by the multimedia file format into media represented by a streaming format by:

including the key identifier in the first packet of a segment associated with the media represented by the streaming format, thereby causing the decoder to ignore the key identifier;

encrypting the payload using the encryption key to obtain an encrypted payload;

including the encrypted payload in the second packet associated with the segment; and increasing security of streaming the media represented by the multimedia file format without introducing lag by streaming the media represented by the streaming format, wherein time to decrypt the media represented by the streaming format is small compared to network delay.

8. The method of claim 7, comprising:

obtaining the media segment representing the portion of the media represented by the multimedia file format, wherein the multiple packets include an Access Unit Network Abstraction Layer (AU NAL) packet, a Sequence Parameter Set Network Abstraction Layer (SPS NAL), a Picture Parameter Set Network Abstraction Layer (PPS NAL), the first packet, the second packet, and an initialization segment, wherein each packet among the multiple packets includes a header and a body; and transforming the media segment associated with the multimedia file format into the segment associated with the streaming format by:

adding the initialization segment associated with the multimedia file format to the first packet of the segment;

encrypting the body of each packet among the multiple packets to obtain multiple encrypted bodies; and adding multiple headers associated with each packet among the multiple packets and the multiple encrypted bodies to the segment associated with the streaming format.

9. The method of claim 7, comprising:

creating multiple streams of the media represented by the streaming format, wherein a first stream among the multiple streams has a bit rate higher than a second stream among the multiple streams;

sending the first stream to a client;

obtaining a request from the client to lower the bit rate; and upon receiving the request, sending the second stream to the client.

10. The method of claim 7, wherein the media represented by the multimedia file format includes video and/or audio.

11. The method of claim 7, comprising:

obtaining the media segment representing the portion of the media represented by the multimedia file format, wherein the multiple packets include an Access Unit Network Abstraction Layer (AU NAL) packet, a Sequence Parameter Set Network Abstraction Layer (SPS NAL), a Picture Parameter Set Network Abstraction Layer (PPS NAL), the first packet, the second packet, and an initialization segment; and transforming the media segment associated with the multimedia file format into the segment represented by the streaming format by:

adding the initialization segment associated with the multimedia file format to the first packet associated with the streaming format.

12. The method of claim 7, comprising:

sending the segment associated with the media represented by the streaming format to a receiver over a network, wherein the network causes the network delay;

causing the receiver to decrypt the encrypted payload, wherein decrypting the encrypted payload requires a first amount of time;

causing the receiver to decode the segment associated with the media represented by the streaming format, wherein decoding the segment associated with the media represented by the streaming format requires a second amount of time; and increasing the security of streaming the media represented by the multimedia file format without introducing the lag, wherein the first amount of time is less than a combination of the network delay and the second amount of time.

13. A system comprising:

at least one hardware processor; and at least one non-transitory memory storing instructions, which, when executed by the at least one hardware processor, cause the system to:

obtain a media segment representing a portion of a media represented by a multimedia file format, wherein the multimedia file format is not configured for streaming, wherein the media segment includes multiple packets including a first packet that is ignored by a decoder, and a second packet that includes a payload;

obtain a key identifier indicating an encryption key, wherein memory occupied by the key identifier is small compared to the memory occupied by the media represented by the multimedia file format;

transform the media represented by the multimedia file format into media represented by a streaming format by:

including the key identifier in the first packet of a segment associated with the media represented by the streaming format, thereby causing the decoder to ignore the key identifier;

encrypting the payload using the encryption key to obtain an encrypted payload;

including the encrypted payload in the second packet associated with the segment; and increasing security of streaming the media represented by the multimedia file format without introducing lag by streaming the media represented by the streaming format, wherein time to decrypt the media represented by the streaming format is small compared to network delay.

14. The system of claim 13, comprising instructions to:

obtain the media segment representing the portion of the media represented by the multimedia file format, wherein the multiple packets include an Access Unit Network Abstraction Layer (AU NAL) packet, a Sequence Parameter Set Network Abstraction Layer (SPS NAL), a Picture Parameter Set Network Abstraction Layer (PPS NAL), the first packet, the second packet, and an initialization segment, wherein each packet among the multiple packets includes a header and a body; and transform the media segment associated with the multimedia file format into the segment associated with the streaming format by:

adding the initialization segment associated with the multimedia file format to the first packet of the segment;

encrypt the body of each packet among the multiple packets to obtain multiple encrypted bodies; and add multiple headers associated with each packet among the multiple packets and the multiple encrypted bodies to the segment associated with the streaming format.

15. The system of claim 13, comprising instructions to:

create multiple streams of the media represented by the streaming format, wherein a first stream among the multiple streams has a bit rate higher than a second stream among the multiple streams;

send the first stream to a client;

obtain a request from the client to lower the bit rate; and upon receiving the request, send the second stream to the client.

16. The system of claim 13, wherein the media represented by the multimedia file format includes video and/or audio.

17. The system of claim 13, comprising instructions to:

obtain the media segment representing the portion of the media represented by the multimedia file format, wherein the multiple packets include an Access Unit Network Abstraction Layer (AU NAL) packet, a Sequence Parameter Set Network Abstraction Layer (SPS NAL), a Picture Parameter Set Network Abstraction Layer (PPS NAL), the first packet, the second packet, and an initialization segment; and transform the media segment associated with the multimedia file format into the segment represented by the streaming format by:

adding the initialization segment associated with the multimedia file format to the first packet associated with the streaming format.

18. The system of claim 13, wherein the multimedia file format includes ISO base media file format (ISO-BMFF), the streaming format includes real-time protocol (RTP), the first packet includes Supplemental Enhancement Information Network Abstraction Layer (SEI NAL) packet, and the second packet includes Video Coding Layer Network Abstraction Layer (VCL NAL) packet.

19. The system of claim 13, wherein the segment associated with the media represented by the streaming format represents a keyframe configured to be decoded without reference to another access unit in the streaming format, or the segment associated with the media represented by the streaming format represents a delta frame configured to be decoded along with a previous keyframe associated with the media represented by the streaming format.

20. The system of claim 13, comprising instructions to:

send the segment associated with the media represented by the streaming format to a receiver over a network, wherein the network causes the network delay;

cause the receiver to decrypt the encrypted payload, wherein decrypting the encrypted payload requires a first amount of time;

cause the receiver to decode the segment associated with the media represented by the streaming format, wherein decoding the segment associated with the media represented by the streaming format requires a second amount of time; and increase the security of streaming the media represented by the multimedia file format without introducing the lag, wherein the first amount of time is less than a combination of the network delay and the second amount of time.

* * * * *